United States Patent
Yu (10) Patent No.: US 8,199,844 B2
(45) Date of Patent: Jun. 12, 2012

(54) APPARATUS AND METHOD FOR CANCELING INTER-ANTENNA INTERFERENCE OF ORTHOGONALLY CODED SIGNALS

(75) Inventor: Donghun Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 12/358,342

(22) Filed: Jan. 23, 2009

(65) Prior Publication Data

US 2010/0061494 A1   Mar. 11, 2010

(30) Foreign Application Priority Data

Sep. 10, 2008  (KR) .................. 10-2008-0089250

(51) Int. Cl.
*H04L 1/02* (2006.01)
(52) U.S. Cl. ...................................... 375/267
(58) Field of Classification Search .......... 375/144, 375/148, 254, 260, 262, 265, 267, 285, 340, 375/341, 346–348; 370/286; 379/406.01, 379/406.05, 406.09; 455/63.1, 67.11, 67.13, 455/67.14
See application file for complete search history.

(56) References Cited

U.S. PATENT DOCUMENTS

| | | | |
|---|---|---|---|
| 7,218,665 | B2 | 5/2007 | McElwain et al. |
| 2004/0146024 | A1* | 7/2004 | Li et al. ................ 370/334 |
| 2005/0249319 | A1* | 11/2005 | Suh et al. .............. 375/347 |
| 2007/0129008 | A1* | 6/2007 | Shi et al. .............. 455/11.1 |
| 2007/0171847 | A1 | 7/2007 | Demaj et al. |
| 2008/0248773 | A1* | 10/2008 | De Carvalho et al. .... 455/278.1 |
| 2010/0183102 | A1* | 7/2010 | Mukai et al. ............ 375/341 |

FOREIGN PATENT DOCUMENTS

| | | |
|---|---|---|
| JP | 2006-067070 A | 3/2006 |
| KR | 10-2008-0061690 A | 7/2008 |

* cited by examiner

*Primary Examiner* — Young T. Tse
(74) *Attorney, Agent, or Firm* — NSIP Law

(57) ABSTRACT

An apparatus and a method for canceling inter-antenna interference are provided. The apparatus to cancel inter-antenna interference includes a reception unit to receive, from a transmitter, first data and second data orthogonally coded with the first data, and to generate a received vector including the first data and the second data, a channel estimation unit to generate a channel state matrix with respect to a radio channel from a plurality of transmission antennas of the transmitter to the reception unit, a detection unit to detect the first data based on the channel state matrix and the received vector, a pseudo interference signal-generation unit to generate pseudo interference signals based on the channel state matrix and the detected first data, and an interference signal-canceling unit to cancel the pseudo interference signals from the received vector.

17 Claims, 6 Drawing Sheets

APPARATUS AND METHOD FOR CANCELING INTER-ANTENNA INTERFERENCE OF ORTHOGONALLY CODED SIGNALS

CROSS-REFERENCE TO RELATED APPLICATION

This application claims the benefit under 35 U.S.C. §119 (a) of a Korean Patent Application No. 10-2008-0089250, filed on Sep. 10, 2008 in the Korean Intellectual Property Office, the entire disclosure of which is incorporated herein by reference.

BACKGROUND

1. Field

The following description relates to an apparatus and method for receiving signals in a mobile telecommunication system, and more particularly, to an apparatus and method for canceling interferences between orthogonally coded signals.

2. Description of Related Art

With the rapid development in a mobile telecommunication system, the amount of data provided by the mobile telecommunication system has increased. A channel state of a radio link between a base station and a terminal of the mobile telecommunication system may vary over time. This is referred to as a fading phenomenon.

In the mobile telecommunication system, amplitude and phase of received signals may be distorted by the fading phenomenon that occurs on a radio channel. The fading phenomenon may introduce errors created on the radio channel between the base station and the terminal, resulting in quality deterioration of the mobile telecommunication services.

To overcome the fading phenomenon, a number of diversity schemes have been proposed. The diversity schemes include a space diversity scheme and a receive diversity scheme. A space diversity scheme uses a plurality of antennas that are spaced apart from one another by a certain distance. A receive diversity scheme receives signals transmitted from a transmitter using a plurality of antennas. However, a receive diversity scheme may be difficult to apply in a downlink of a mobile telecommunication environment due to a limited size of the terminal. Accordingly, various types of transmit diversity scheme transmitting signals using a plurality of antennas are being developed.

As one of the transmit diversity schemes, an orthogonal coding scheme may encode a large amount of data to be transmitted by a transmitter to thereby generate a plurality of data streams orthogonal to each other, and transmit the generated data streams to a receiving apparatus using a plurality of time slots and frequencies.

SUMMARY

In one general aspect, there is provided an apparatus to prevent or cancel interferences between data transmitted using a plurality of transmission antennas.

In another general aspect, an apparatus to cancel inter-antenna interference includes a reception unit to receive, from a transmitter, first data and second data orthogonally coded with the first data, and to generate a received vector including the first data and the second data, a channel estimation unit to generate a channel state matrix with respect to a radio channel from a plurality of transmission antennas of the transmitter to the reception unit, a detection unit to detect the first data based on the channel state matrix and the received vector, a pseudo interference signal-generation unit to generate pseudo interference signals based on the channel state matrix and the detected first data, and an interference signal-canceling unit to cancel the pseudo interference signals from the received vector, wherein the detection unit may detect the second data based on the received vector from which the pseudo interference signals are cancelled.

The apparatus may further comprise an inverse matrix calculation unit to calculate an inverse matrix of the channel state matrix or a pseudo-inverse matrix of the channel state matrix, wherein the detection unit may multiplies the inverse matrix of the channel state matrix or the pseudo-inverse matrix of the channel state matrix by the received vector to detect the first data.

The apparatus may further comprise a priority determination unit to determine a data detection priority by comparing the first data with the second data.

The detection unit may detect each of the received data, and the priority determination unit may determine the data detection priority based on differences between the detected data and elements of the received vector corresponding to the detected data.

The detection unit may detect each of the received data and generate a detection data vector with respect to each of the received data.

The apparatus may further comprise a covariance matrix calculation unit to calculate a covariance matrix of the received vector and detection data vector.

The priority determination unit may determine the data detection priority based on magnitudes of diagonal elements of the covariance matrix.

The priority determination unit may determine the data detection priority based on magnitudes of powers of data including the interference signals.

The detection unit may detect the first data using a zero-forcing detection scheme or a minimum-mean square error (MMSE) detection scheme.

In still another general aspect, a method for an apparatus to cancel inter-antenna interference includes receiving, from a transmitter, first data and second data orthogonally coded with the first data; generating a received vector including the first data and second data, generating a channel state matrix with respect to a radio channel from a plurality of transmission antennas of the transmitter to a receiver of the apparatus, detecting the first data based on the channel state matrix and the received vector, generating pseudo interference signals based on the channel state matrix and the detected first data, canceling the pseudo interference signals from the received vector, and detecting the second data based on the received vector from which the pseudo interference signals are cancelled.

The method may further comprise calculating an inverse matrix of the channel state matrix or a pseudo-inverse matrix of the channel state matrix, wherein the detecting of the first data comprises multiplying the inverse matrix of the channel state matrix or the pseudo inverse matrix of the channel state matrix by the received vector to detect the first data.

The method may further comprise determining a data detection priority by comparing the first data with the second data.

The method may further comprise detecting data including interference signals based on the received vector, wherein the determining of the data detection priority comprises determining the data detection priority based on differences between the data including the interference signals and elements of the received vector corresponding to the data including the interference signals.

The method may further comprise detecting data including interference signals based on the received vector, and generating a detection data vector including the data including the interference signals, and calculating a covariance matrix of the received vector and detection data vector, wherein the determining of the data detection priority comprises determining the data detection priority based on magnitudes of diagonal elements of the covariance matrix.

The determining of the data detection priority may comprise determining the data detection priority based on magnitudes of powers of the data including the interference signals.

The detecting of the first data may comprise detecting the first data using a zero-forcing detection scheme or a MMSE detection scheme.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions are omitted to increase clarity and conciseness.

Figure 1:
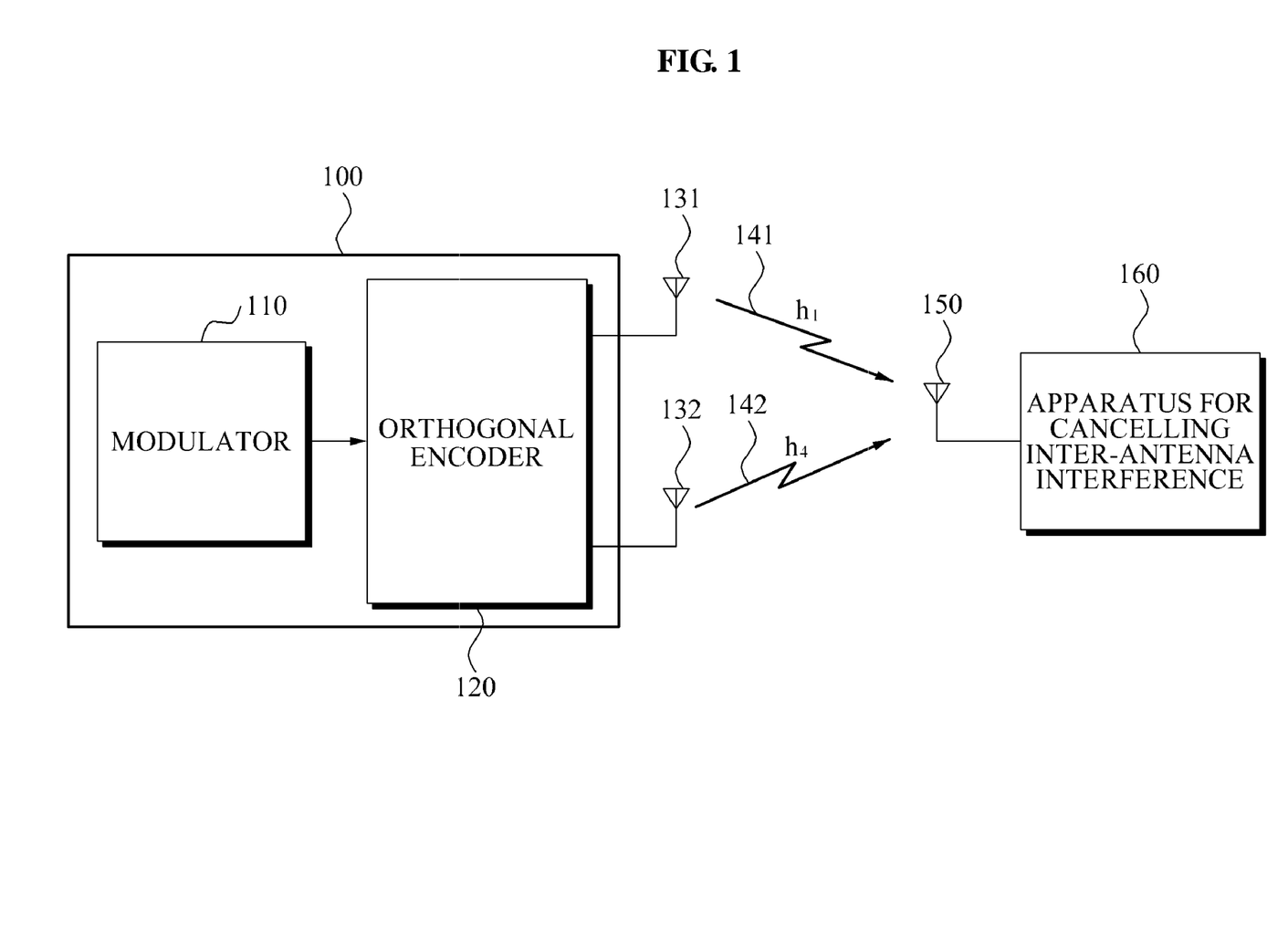
FIG. 1 is a diagram illustrating a concept for receiving transmission signals orthogonally coded using an apparatus to cancel inter-antenna interference according to an exemplary embodiment.

FIG. 1 illustrates a concept for receiving transmission signals orthogonally coded using an apparatus 160 to cancel inter-antenna interference according to an exemplary embodiment.

Referring to FIG. 1, a modulator 110 of a transmitter 100 may modulate data to be transmitted to the apparatus 160 to generate transmission signals. An orthogonal encoder 120 may perform orthogonal coding on the signals modulated by the modulator 110 to generate a plurality of signals orthogonal to each other. The orthogonally coded plurality of signals may be transmitted to the interference-canceling apparatus 160 through a plurality of transmission antennas, for example, antennas 131 and 132. While the transmitter 100 having two transmission antennas 131 and 132 are shown, it is understood that this is only exemplary and the number of antennas is not limited thereto. For example, according to another exemplary embodiment, a transmitter 100 may have four or eight transmission antennas.

The orthogonal encoder 120 may perform orthogonal coding on a plurality of data which the transmitter 100 transmits using a plurality of time slots. The orthogonal encoder 120 may generate a plurality of signals which each of the plurality of transmission antennas transmits using the plurality of time slots. The plurality of signals transmitted by each of the plurality of transmission antennas may be orthogonal to each other where a radio channel state from each of the plurality of transmission antennas to the apparatus 160 is not changed.

The magnitude and phase of the signals transmitted from the plurality of transmission antennas 131 and 132 may be distorted while passing through radio channels 141 and 142 reaching the apparatus 160.

A channel state of the actual radio channels 141 and 142 may vary over time due to a fading phenomenon. Since the signals orthogonally coded by the orthogonal encoder 120 may be transmitted through the plurality of time slots, a radio channel state of a mobile telecommunication system may vary while the signals are transmitted. As a result, orthogonality between the orthogonally coded signals may not be maintained.

Due to the fading of the radio channels 141 and 142, the signals transmitted through each of the plurality of antennas 131 and 132 may no longer be orthogonal to each other in a mobile communication environment. Accordingly, interferences between the signals transmitted through each of the plurality of transmission antennas may be generated.

Performance of the apparatus 160 may be deteriorated due to the interferences generated between the signals transmitted through each of the plurality of transmission antennas 131 and 132.

The apparatus 160 may cancel interferences between signals generated due to the fading of the radio channels 141 and 142.

Figure 2:
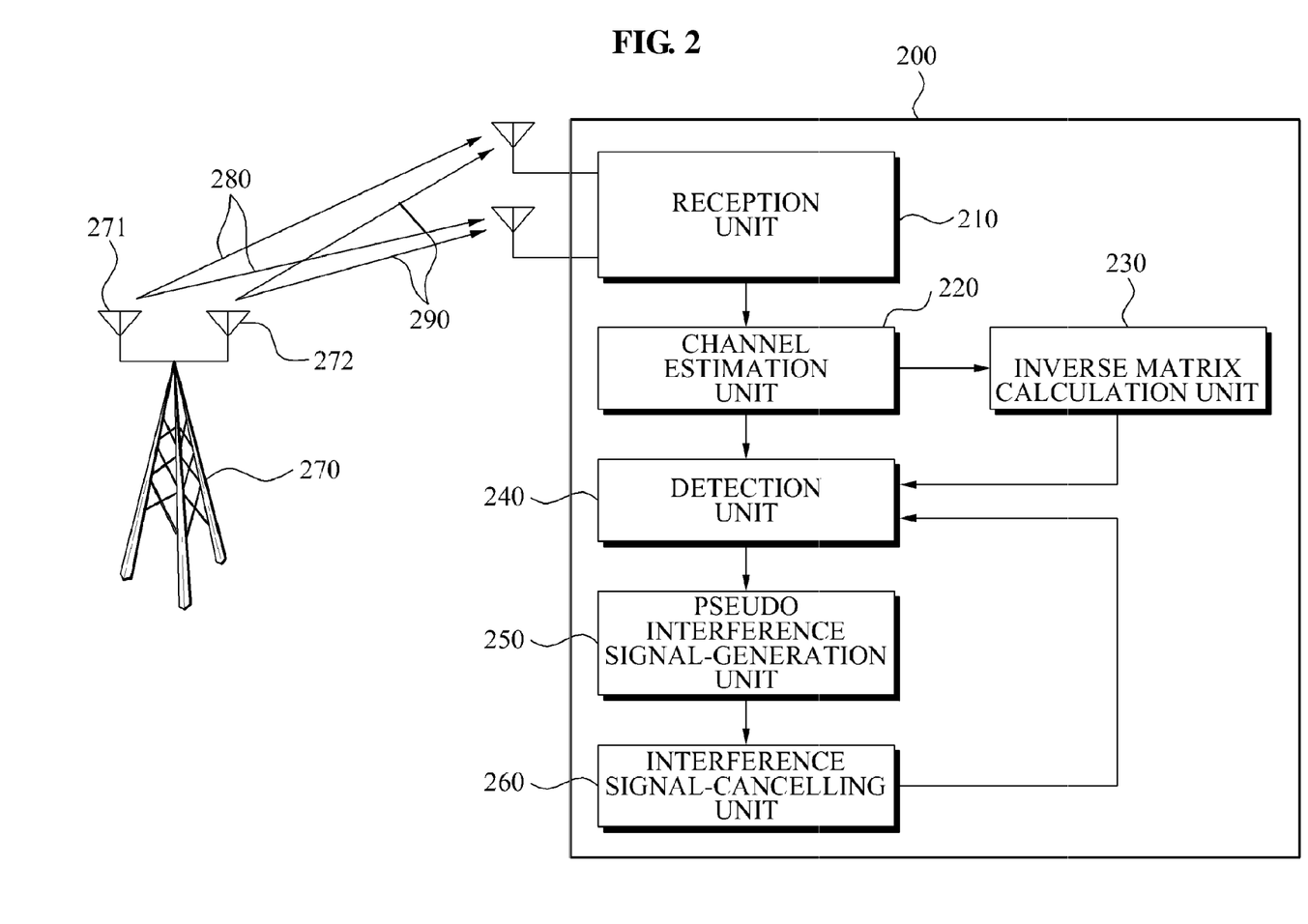
FIG. 2 is a block diagram illustrating an apparatus to cancel inter-antenna interference according to an exemplary embodiment.

FIG. 2 illustrates an apparatus 200 to cancel inter-antenna interference according to an exemplary embodiment. As illustrated in FIG. 2, the apparatus 200 includes a reception unit 210, a channel estimation unit 220, an inverse matrix calculation unit 230, a detection unit 240, a pseudo interference signal-generation unit 250, and an interference signal-canceling unit 260.

The reception unit 210 may receive, from a transmitter 270, first data and second data, and generate a received vector including the first data and the second data. The transmitter 270 may perform orthogonal coding on the first data and the second data to generate a plurality of data streams. The transmitter 270 may transmit the plurality of data streams to the reception unit 210 using a plurality of transmission antennas 271 and 272. A first data stream 280 may be transmitted using the first transmission antenna 271, and a second data stream 290 may be transmitted using the second transmission antenna 272. The first data stream 280 and the second data stream 290 generated by the transmitter 270 may be orthogonal to each other.

The amplitudes and phases of the first data stream 280 and the second data stream 290 may change while passing through a radio channel between the transmitter 270 and the apparatus 200. The radio channel state may vary over time. The first data stream 280 and the second data stream 290 having passed through the radio channel varying over time may no longer be orthogonal to each other. The first data stream 280 and the second data stream 290 which are not orthogonal to each other may cause interference with each other.

According to an aspect, orthogonally coded signals received by the reception unit 210 may be orthogonal space-time block coded signals or orthogonal space-frequency block coded signals. The orthogonal space-time block coded signals may pass through a plurality of time slots and may be transmitted to the apparatus 200, and the orthogonal space-frequency block coded signals may be transmitted to the apparatus 200 using a plurality of frequency bands. The reception unit 210 may generate a received vector in which signals received in each of the plurality of time slots or signals received in each of the plurality of frequency bands act as elements of the received vector.

The channel estimation unit 220 may estimate a state of a radio channel from the plurality of transmission antennas of the transmitter 270 to the apparatus 200 to generate a channel state matrix. Since the transmitter 270 includes the plurality of transmission antennas 271 and 272, the radio channel from the transmitter 270 to the apparatus 200 may be a vector channel of which the dimension is the same to a number of the plurality of transmission antennas of the transmitter 270.

The vector channel may be generated for each of the plurality of time slots or each of the plurality of frequency bands according to orthogonal coding schemes. The channel state generated by the channel estimation unit 220 may have a matrix type. Where the transmitter 270 transmits the orthogonal space-time block coded signals, a magnitude of the channel state matrix may be determined based on a number of the plurality of time slots and a number of the antennas. Also, where the transmitter 270 transmits the orthogonal space-frequency block coded signals, the magnitude of the channel state matrix may be determined based on a number of the plurality of frequency bands and a number of the antennas.

For example, it is assumed that the transmitter 270 may encode the first and second data according to a space-time coding scheme to generate the first data stream 280 and the second data stream 290. The transmitter 270 may transmit the first data stream 280 and the second data stream and 290 to the apparatus 200 using the two transmission antennas 271 and 272. In this case, a channel state matrix generated by the channel estimation unit 220 may be determined as Equation 1 below, which is represented as:

$$H = \begin{bmatrix} h_1(2n) & h_2(2n) \\ h_2^*(2n+1) & -h_1^*(2n+1) \end{bmatrix},$$ [Equation 1]

wherein, $h_k(m)$ denotes a radio channel state from a k-th transmission antenna of the transmitter 270 in an m-th time slot to the apparatus 200. The radio channel state may be constant regardless of a lapse of time where the fading of the radio channel does not occur, which is represented as $h_k(m) = h_k(m+1)$. Accordingly, respective columns of the channel state matrix may be orthogonal to each other. However, the fading may occur in an actual radio channel of the mobile telecommunication system. The radio channel state may vary over time due to the fading, which satisfies $h_k \neq h_k(m+1)$. The respective columns of the channel state matrix may not be orthogonal to each other.

According to an aspect, the plurality of transmission antennas 271 and 272 of the transmitter 270 may transmit to the apparatus 200 a plurality of pilot signals depending on each of the plurality of transmission antennas 271 and 272, and the channel estimation unit 220 may generate the channel state matrix based on the plurality of pilot signals.

According to an aspect, where the radio channel state is the same as the Equation 1, a received vector received by the reception unit 210 may be represented as:

$$r = H \cdot s + w,$$ [Equation 2]

wherein, r denotes the received vector, and H denotes a channel state matrix estimated by the channel estimation unit 220. Also, s denotes a vector comprised of signals transmitted by the transmitter 270, which may be determined as Equation 3 below, and w denotes a thermal noise vector generated while receiving signals, which may determined as Equation 4 below:

$$s = [s(2n)s(2n+1)]^T,$$ [Equation 3]

wherein s(m) denotes a signal transmitted by an m-th transmission antenna of the transmitter 270; and $$w = [w(2n)w^*(2n+1)]^T,$$ [Equation 4]

wherein w(m) denotes a thermal noise element generated while receiving signals in an m-th time slot, and w*(m) denotes a complex conjugate of the thermal noise generated while receiving the signals in the m-th time slot.

The inverse matrix calculation unit 230 may calculate an inverse matrix of a channel state matrix or a pseudo-inverse matrix of the channel state matrix. A channel state matrix generated by the channel estimation unit 220 may be a square matrix where a number of the plurality of transmission antennas of the transmitter 270 and a number of receiving antennas of the apparatus 200 are the same. In this case, the inverse matrix calculation unit 230 may calculate an inverse matrix of the channel state matrix.

The inverse matrix calculation unit 230 may calculate a pseudo-inverse matrix of the channel state matrix where the number of the plurality of transmission antennas of the transmitter 270 and the number of receiving antennas of the apparatus 200 are not the same.

The detection unit 240 may detect the first data received by the reception unit 210 based on the channel state matrix and the received vector. According to an aspect, the detection unit 240 may multiply the inverse matrix of the channel state matrix or the pseudo-inverse matrix of the channel state matrix by the received vector to detect the first data.

According to an aspect, the detection unit 240 may detect the first data using a zero-forcing detection scheme or a Minimum-Mean Square Error (MMSE) detection scheme.

The pseudo interference signal-generation unit 250 may generate pseudo interference signals based on the channel state matrix and the first data detected by the detection unit 240. According to an aspect, the pseudo interference signal-generation unit 250 may generate the pseudo interference signals according to Equation 5 below, which is represented as:

$$i(n) = \hat{h}_1 \cdot \hat{s}_1,$$ [Equation 5]

wherein i(n) denotes a pseudo interference signal generated by the first data, $\hat{h}_1$ denotes a channel state vector with respect to a radio channel through which the first data is transmitted, and $\hat{s}_1$ denotes the first data detected by the detection unit 240.

The interference signal-canceling unit 260 may cancel the pseudo interference signals from the received vector. The first data detected by the detection unit 240 may incur interference from the second data. Also, the second data included in the received vector may incur interference from the first data.

According to an aspect, the interference signal-canceling unit 260 may cancel interference generated due to the first data from the received vector.

The detection unit 240 may detect the second data based on the received vector from which the pseudo interference signals are canceled. Since the interference generated due to the first data is canceled, the probability of successfully detecting the second data may be increased.

According to an aspect, the reception unit 210 may further receive third data and fourth data from the transmitter 270. In this case, the pseudo interference signal-generation unit 250 may generate pseudo interference signals with respect to interference signals generated due to the second data. The interference signal-canceling unit 260 may cancel, from receiving signals, the pseudo interference signals with respect to the interference signals generated due to the second data. The detection unit 240 may detect the third data and the fourth data from the receiving signals from which interference generated due to the first data and the second data are canceled. Since the interference generated due to the first data and the second data may be eliminated from the receiving signals, the probability of successfully detecting the third data and the fourth data may be increased.

Figure 3:
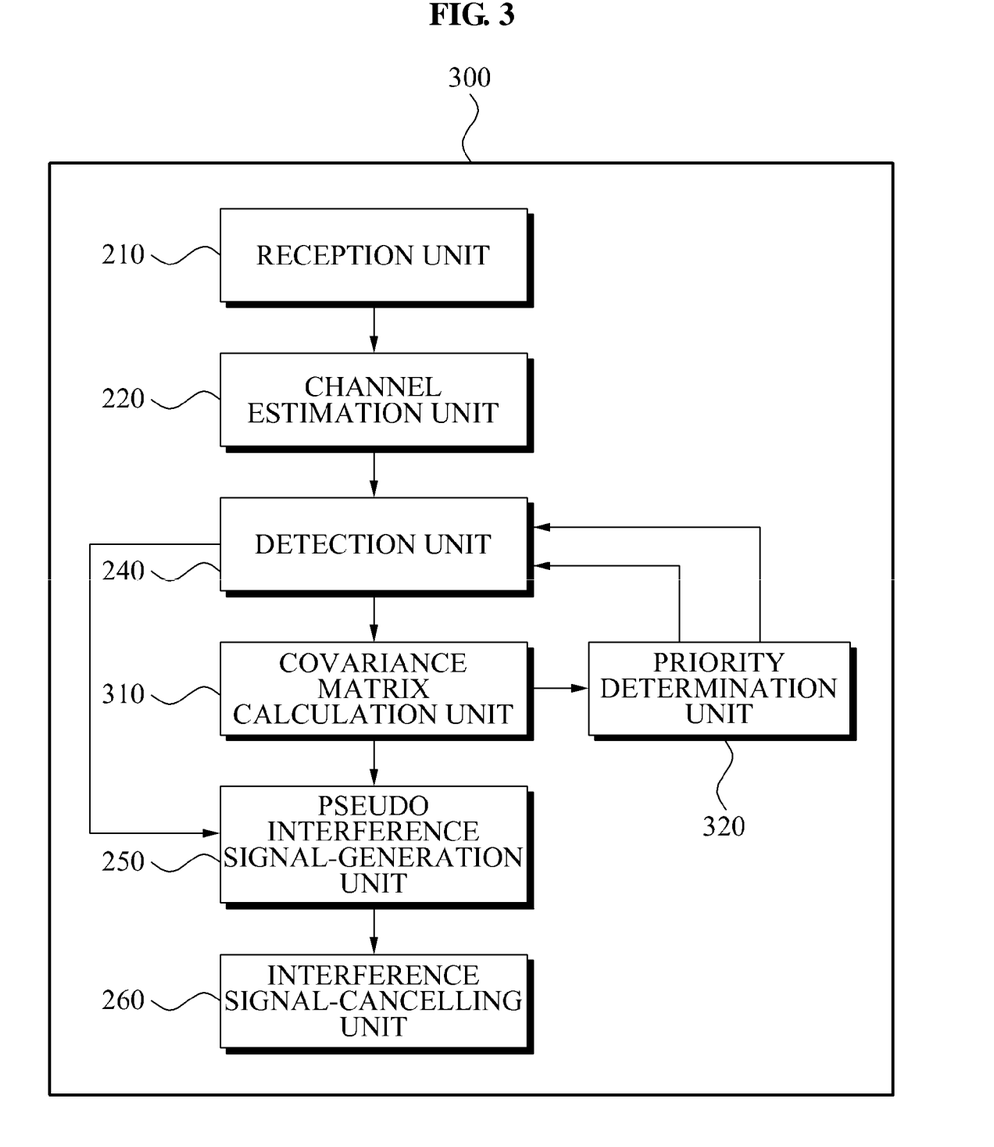
FIG. 3 is a block diagram illustrating an apparatus to cancel inter-antenna interference according to another exemplary embodiment.

FIG. 3 illustrates an apparatus 300 to cancel inter-antenna interference according to another exemplary embodiment. As illustrated in FIG. 3, the apparatus 300 includes a reception unit 210, a channel estimation unit 220, a detection unit 240, a covariance matrix calculation unit 310, a priority determination unit 320, a pseudo interference signal-generation unit 250, and an interference signal-canceling unit 260.

Operations of the reception unit 210, the channel estimation unit 220, the detection unit 240, the pseudo interference signal-generation unit 250, and the interference signal-canceling unit 260 of the apparatus 300 of FIG. 3 are similar to those of the apparatus 200 of FIG. 2, and thus the detailed descriptions will be omitted. Operation of the covariance matrix calculation unit 310 and priority determination unit 320 will be herein described.

The priority determination unit 320 may determine a data detection priority with respect to the first and second data. According to an aspect, the priority determination unit 320 may determine a higher priority with respect to data that is transmitted passing through a more superior radio channel condition from among the first and second data.

The pseudo interference signal-generation unit 250 may generate the pseudo interference signals based on initially detected data. The detection unit 240 may detect other data based on the pseudo interference signals. Accordingly, reliability of subsequently detected data may be significantly reduced where errors occur in the initially detected data.

The priority determination unit 320 may select the most superior data, from among a plurality of data received by the reception unit 210, as data to be initially detected. According to an aspect, the priority determination unit 320 may determine a data detection priority with respect to the first and second data received by the reception unit 210.

According to an aspect, the detection unit 240 may detect each data received by the reception unit 210, and the priority determination unit 320 may compare each value of the detected data with a value of elements of a received vector corresponding to the detected data, and determine the data detection priority based on the compared result.

According to an aspect, the priority determination unit 320 may estimate the detected data as superior data where a difference between the value of the detected data and the value of the elements of the received vector is insignificant, and assign a higher data detection priority to the detected data. Conversely, the priority determination unit 320 may assign a lower data detection priority to the detected data where the difference between the value of the detected data and the value of the elements of the received vector is significant.

According to an aspect, the priority determination unit 320 may determine the data detection priority depending on a magnitude of a power of the detected data. A radio channel state through which data is transmitted may vary over time. Accordingly, a magnitude and phase of each data may also vary while each data is passing through the radio channel. A possibility in which errors occur in data may be significantly high where the magnitude of the data becomes small while the data is passing through the radio channel. Accordingly, the priority determination unit 320 may assign a lower priority to received data where a magnitude of the received data is small, and assign a higher priority to the received data where the magnitude of the received data is great.

According to an aspect, the detection unit 240 may detect each of the received data, and generate a detection data vector including each of the detected data. The covariance matrix calculation unit 310 may calculate a covariance matrix of the received vector and detection data vector, and the priority determination unit 320 may determine the data detection priority based on magnitudes of diagonal elements of the covariance matrix.

According to an aspect, the covariance matrix calculation unit 310 may calculate the covariance matrix of the received vector and detection data vector according to Equation 6 below, which is represented as:

$$X = E[(s(n) - s_{est}(n)) \cdot (s(n) - s_{est}(n))^H]$$
$$= \sigma_w^2 \cdot P(n),$$
[Equation 6]

wherein X denotes the covariance matrix of the received vector and detection data vector, s(n) denotes the received vector, $s_{est}(n)$ denotes the detection data vector having detected data as its elements, and $\sigma_w^w$ denotes a power of thermal noise. Where the detection unit 240 detects data using the zero-forcing detection scheme, P(n) may be determined according to Equation 7 below and P(n) may be determined according to Equation 8 below where the detection unit 240 detects data using the MMSE detection scheme:

$$P(n) = H^+(n) \cdot (H^+(n))^H,$$
[Equation 7]

wherein $H^+(n)$ denotes a pseudo-inverse matrix of a channel state matrix H; and $$P(n) = H^H(n) \cdot (H(n) \cdot H^H(n) + \sigma_2^2 \cdot I)^{-1},$$
[Equation 8]

wherein I denotes an identity matrix, and $H^H(n)$ denotes a Hermitian (conjugate transpose) matrix of the channel state matrix H.

Referring to the Equation 6, a magnitude of diagonal elements of the matrix P(n) may be in proportion to a difference in values between elements of the received vector and elements of the detection data vector. For example, where a difference in values between a specific element of the received vector and an element of the detection data vector corresponding to the specific element of the received vector is insignificant, a magnitude of the diagonal element of the matrix P(n) corresponding to the specific element of the received vector becomes small. The priority determination unit 320 may estimate that the detected data vector is significantly superior, where the difference in values between the specific element of the received vector and the element of the detection data vector corresponding to the specific element of the received vector is insignificant.

According to an aspect, the priority determination unit 320 may determine a data detection priority between respective data received by the reception unit 210 depending on a magnitude of diagonal elements of P(n). Where the magnitude of the diagonal elements of P(n) is small, the priority determination unit 320 may assign a higher data detection priority with respect to data corresponding to the diagonal elements of P(n).

Figure 4:
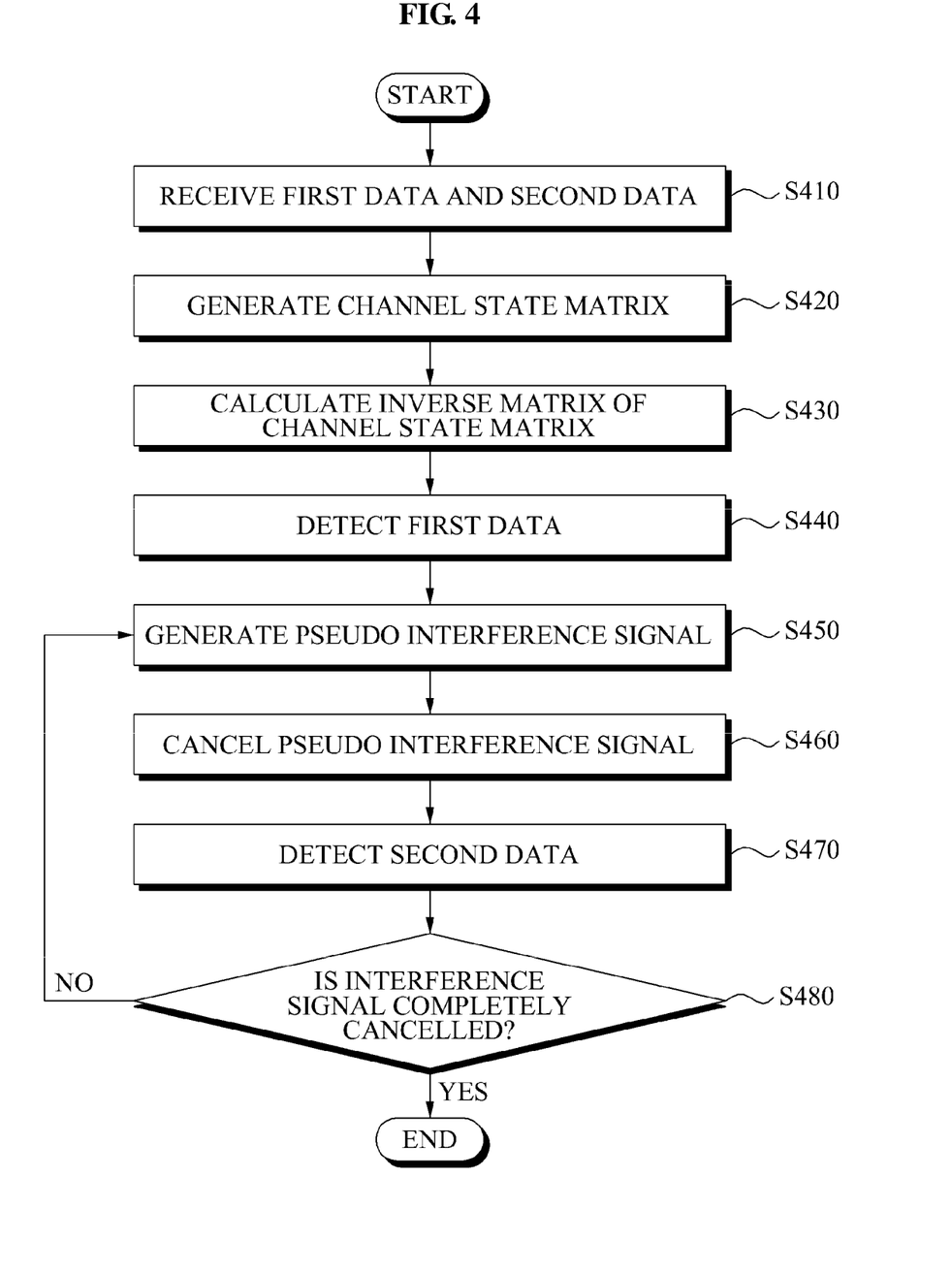
FIG. 4 is a flowchart illustrating a method for canceling inter-antenna interference according to an exemplary embodiment.

FIG. 4 illustrates a method for canceling inter-antenna interference according to an exemplary embodiment. The method may be practiced in exemplary systems of FIGS. 1-3 and carried out by exemplary apparatuses and/or transmitters of FIGS. 1-3.

In operation S410, an apparatus to cancel inter-antenna interference may receive first data and second data from a transmitter. The transmitter may perform orthogonal coding on the first data and the second data, and transmit the orthogonally coded data to the apparatus.

The transmitter may perform orthogonal space-time block coding on the first data and the second data, or perform orthogonal space-frequency block coding on the first data and the second data. The transmitter may perform orthogonal coding on the first data and the second data to generate a first data stream and a second data stream. The first data stream and the second data stream may be orthogonal to each other. The transmitter may include a plurality of transmission antennas. The transmitter may transmit the first data stream using a first transmission antenna, and transmit the second data stream using a second transmission antenna.

The apparatus to cancel inter-antenna interference may receive the first data and the second data which are coded in a first data stream and a second data stream in the operation S410.

In operation S420, the apparatus may generate a received vector including the first data and the second data.

In operation S430, the apparatus may generate a channel state matrix with respect to a radio channel from the plurality of transmission antennas of the transmitter to the apparatus. The channel state matrix may be a vector channel of which the dimension is the same to a number of the plurality of transmission antennas of the transmitter.

For example, the transmitter may encode the first data and the second data according to a space-time coding scheme to generate the first and second data streams. In this case, the channel state matrix generated in the operation S430 may be determined as Equation 9 below, which is represented as:

$$H = \begin{bmatrix} h_1(2n) & h_2(2n) \\ h_2^*(2n+1) & -h_1^*(2n+1) \end{bmatrix},$$ [Equation 9]

wherein, $h_k(m)$ denotes a radio channel state from a k-th transmission antenna of the transmitter in an m-th time slot to the apparatus. The radio channel state may be constant regardless of lapse of time where the fading of the radio channel does not occur, which is represented as $h_k(m)=h_k(m+1)$. Accordingly, respective columns of the channel state matrix may be orthogonal to each other. However, the fading may occur in an actual radio channel of the mobile telecommunication system. The radio channel state may vary over time due to the fading, which satisfies $h_k(m) \ne h_k(m+1)$. The respective columns of the channel state matrix may be not orthogonal to each other.

Where the radio channel state is the same as the Equation 9 above, a received signal generated in the operation S410 may be represented as:

$$r = H \cdot s + w,$$ [Equation 10]

wherein, r denotes a received vector, and H denotes a channel state matrix. Also, s denotes a vector comprised of signals transmitted by the transmitter, which is determined as Equation 11 below, and w denotes a thermal noise vector generated while receiving signals, which is determined as Equation 12 below:

$$s = [s(2n) s(2n+1)]^T,$$ [Equation 11]

wherein s(m) denotes a signal transmitted by an m-th transmission antenna of the transmitter; and $$w = [w(2n) w^*(2n+1)]^T,$$ [Equation 12]

wherein w(m) denotes a thermal noise element generated while receiving signals in an m-th time slot, and w*(m) denotes a complex conjugate of the thermal noise generated while receiving the signals in the m-th time slot.

In the operation S430, the apparatus may calculate an inverse matrix of the channel state matrix. The apparatus may receive data using a plurality of receiving antennas. The channel state matrix may be a square matrix where a number of the plurality of transmission antennas of the transmitter and a number of the plurality of receiving antennas of the apparatus are the same. Accordingly, the apparatus may calculate the inverse matrix of the channel state matrix.

The channel state matrix may be not the square matrix where the number of the plurality of transmission antennas of the transmitter and the number of the plurality of receiving antennas of the apparatus are not the same, and in the operation S430, the apparatus may calculate a pseudo-inverse matrix of the channel state matrix.

In operation S440, the apparatus may detect first data based on the channel state matrix and the received vector. In the operation S440, the apparatus may calculate the first data using the zero-forcing detection scheme or the MMSE detection scheme.

In the operation S440, the apparatus may multiply the inverse matrix of the channel state matrix or the pseudo-inverse matrix of the channel state matrix by the received vector to detect the first data.

In operation S450, the apparatus may generate pseudo interference signals based on the channel state matrix and the detected first data. In the operation S450, the apparatus may generate the pseudo interference signals according to Equation 13 below, which is represented as:

$$i(n) = \hat{h}_1 \cdot \hat{s}_1,$$ [Equation 13]

wherein i(n) denotes a pseudo interference signal generated by the first data, $\hat{h}_1$ denotes a channel state vector with respect to a radio channel through which the first data is transmitted, and $\hat{s}_1$ denotes the first data detected by the detection unit.

In operation S460, the apparatus may cancel the pseudo interference signals from the received vector. The second data included in the received vector may incur interference from the first data. In operation S470, the second data included in the receiving signals may not incur interference from the first data where the pseudo interference signals associated with the first data are canceled from the received vector.

In the operation S470, the apparatus may detect the second data based on the received vector from which the pseudo interference signals are canceled. Since interference due to the first data is canceled, the second data may be accurately detected.

The transmitter may transmit third data as well as the first data and the second data to the apparatus. The apparatus may generate the received vector including the first data, the second data, and the third data. In operation S480, the apparatus may determine whether the interference signals are completely canceled. The received vector may still include the third data where the second data is detected in the operation S470. In the operation S480, the apparatus may estimate that the interference signal is not completely canceled.

In this case, in the operation S450, the apparatus may generate pseudo interference signals with respect to the second data based on the detected second data. Also, in the operation S460, the apparatus may cancel the pseudo interference signals with respect to the second data from the received vector. Accordingly, effects of the interference signals due to the first data and the second data may be removed from the received vector. In the operation S470, the apparatus may detect the third data based on the received vector from which the effects of the interference signals due to the first data and the second data are removed. Since effects of the first data and the second data are removed from the received vector, the third data may be accurately detected.

Figure 5:
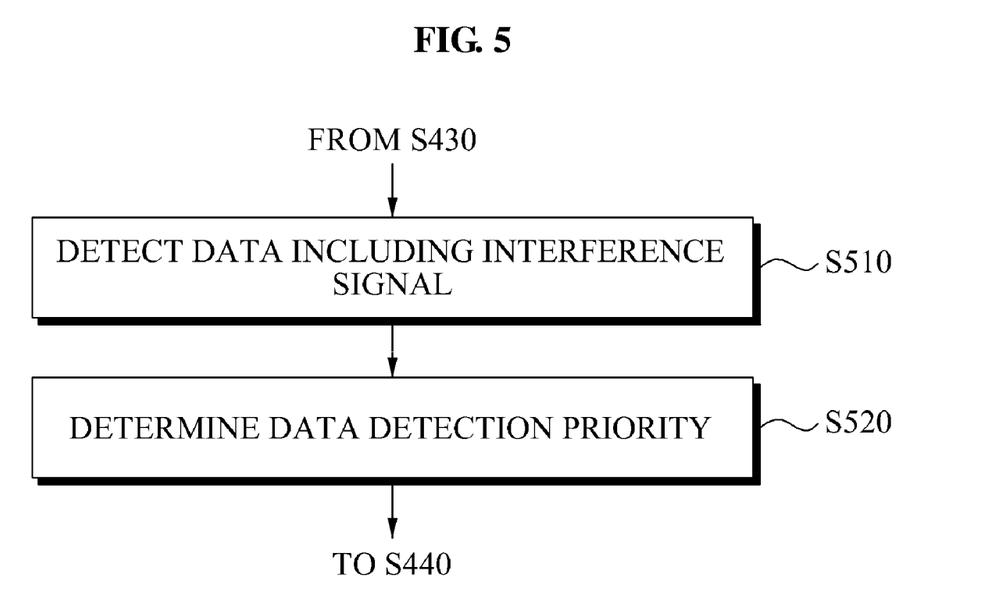
FIG. 5 is a flowchart illustrating a method for canceling inter-antenna interference according to another exemplary embodiment.

FIG. 5 illustrates a method for canceling inter-antenna interference according to another exemplary embodiment. The method may be practiced in exemplary systems of FIGS. 1-3 and carried out by exemplary apparatuses and/or transmitters of FIGS. 1-3.

In operation S510, the apparatus may detect each data received from the transmitter based on a received vector. The data detected in the operation S510 may incur effects of interference signals differently from the data detected in the operation S470. Accordingly, the data detected in the operation S510 may be not more accurately detected than the data detected in the operation S470.

In operation S520, the apparatus may determine a data detection priority with respect to each data based on the data detected in the operation S510. In the operation S520, the apparatus may compare the data detected in the operation S510 with one another to determine the data detection priority.

The apparatus may generate pseudo interference signals based on initially detected data. Also, the apparatus may detect other data based on the generated pseudo interference signals. Reliability of subsequently detected data may be reduced where errors occur in the initially detected data. Accordingly, it may be desirable to determine the data detection priority between a plurality of data.

For example, the data detection priority may be determined based on a magnitude of a power of each data detected in the operation S520. A magnitude and phase of each data may be changed while each data is passing through a radio channel. A possibility in which errors occur in data may be significantly high where the magnitude of the data becomes small while the data is passing through the radio channel. Accordingly, in the operation S520, the apparatus may assign a lower priority to received data where a power of the received data is small, and assign a higher priority to the received data where the power of the received data is great.

In the operation S520, the apparatus may compare a value of the detected data with a value of elements of a received vector corresponding to the detected data, and determine the data detection priority based on the compared result.

In the operation S520, the apparatus may estimate the detected data as superior data where a difference between the value of the detected data and the value of the elements of the received vector is insignificant, and assign a higher data detection priority to the detected data. Conversely, in the operation S520, the apparatus may assign a lower data detection priority to the detected data where the difference between the value of the detected data and the value of the elements of the received vector is significant.

In the operation S520, it is assumed that a higher data detection priority is assigned to the first data, and a lower data detection priority is assigned to the second data. In the operation S440, the apparatus may initially detect the first data. Also, in the operation S440, the apparatus may generate pseudo interference signals based on the first data, and in the operation S460, the apparatus may cancel the pseudo interference signals from the received vector. In the operation S470, the apparatus may detect the second data based on the received vector from which the pseudo interference signals are canceled.

Figure 6:
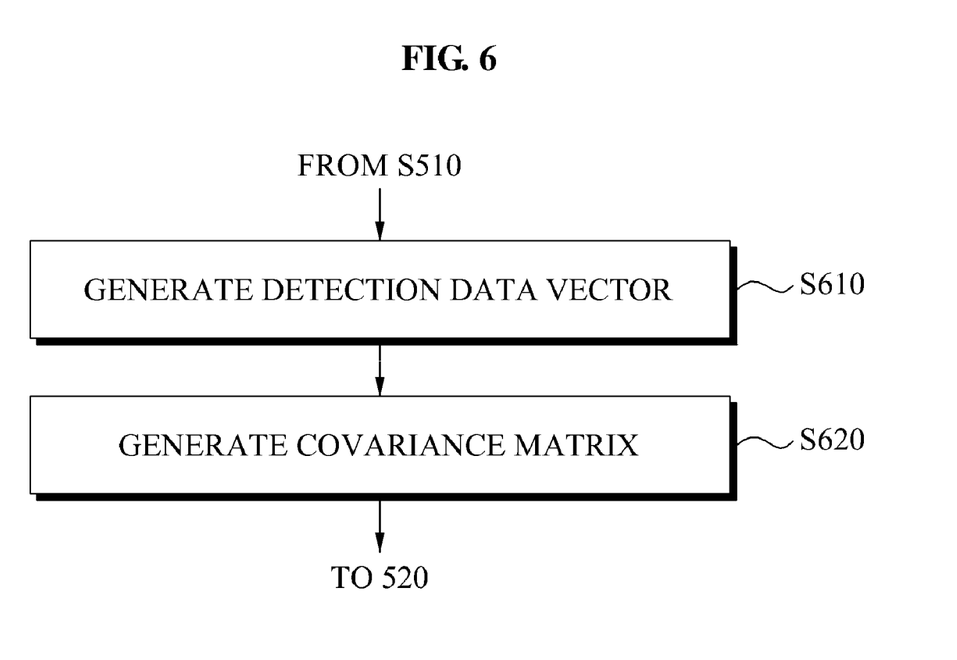
FIG. 6 is a flowchart illustrating a method for canceling inter-antenna interference according to still another exemplary embodiment.

FIG. 6 illustrates a method for canceling inter-antenna interference according to still another exemplary embodiment. The method may be practiced in exemplary systems of FIGS. 1-3 and carried out by exemplary apparatuses and/or transmitters of FIGS. 1-3.

In operation S610, the apparatus may detect each data based on a received vector. The detected data may incur effects of interference signals generated due to other data. In the operation S610, the apparatus may generate a detection data vector including the detected data.

In operation S620, the apparatus may generate a covariance matrix of the received vector and detection data vector. In the operation S620, the apparatus may generate the covariance matrix according to Equation 14, which is represented as:

$$X = E[(s(n) - s_{est}(n)) \cdot (s(n) - s_{est}(n))^H] \quad \text{[Equation 14]}$$
$$= \sigma_w^2 \cdot P(n),$$

wherein X denotes the covariance matrix of the received vector and detection data vector, s(n) denotes the received vector, $s_{est}(n)$ denotes the detection data vector whose element is the detected data, and $\sigma_w^2$ denotes a power of thermal noise. In a case where each data including interference signals is detected using the zero-forcing detection scheme, P(n) may be determined according to Equation 15 below, and P(n) may be determined according to Equation 16 below where each data including the interference signals is detected using the MMSE detection scheme:

$$P(n) = H^+(n) \cdot (H^+(n))^H, \quad \text{[Equation 15]}$$

wherein $H^+(n)$ denotes a pseudo-inverse matrix of a channel state matrix H; and $$P(n) = H^H(n) \cdot (H(n) \cdot H^H(n) + \sigma_2^2 \cdot I)^{-1}, \quad \text{[Equation 16]}$$

wherein I denotes an identity matrix, and $H^H(n)$ denotes a Hermitian (conjugate transpose) matrix of the channel state matrix H.

Referring to the Equation 14, a magnitude of diagonal elements of the matrix P(n) may be in proportion to a difference in values between elements of the received vector and elements of the detection data vector. For example, where a difference in values between a specific element of the received vector and an element of the detection data vector corresponding to the specific element of the received vector is insignificant, a magnitude of the diagonal element of the matrix P(n) corresponding to the specific element of the received vector becomes small. The apparatus may estimate that the detected data vector is significantly superior where the difference in values between the specific element of the received vector and the element of the detection data vector corresponding to the specific element of the received vector is insignificant.

In the operation S620, the apparatus may determine a data detection priority between respective data received by a reception unit of the apparatus depending on a magnitude of diagonal elements of P(n). Where the magnitude of the diagonal elements of P(n) is small, a priority determination unit of the apparatus may assign a higher data detection priority with respect to data corresponding to the diagonal elements of P(n).

The methods described above including a method for canceling inter-antenna interference may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to cancel inter-antenna interference, the apparatus comprising:
   a reception unit configured to receive, from a transmitter, first data and second data orthogonally coded with the first data, and to generate a received vector including the first data and the second data;
   a channel estimation unit configured to generate a channel state matrix with respect to a radio channel from a plurality of transmission antennas of the transmitter to the reception unit;
   a detection unit configured to detect the first data based on the channel state matrix and the received vector;
   a pseudo interference signal-generation unit configured to generate pseudo interference signals based on the channel state matrix and the detected first data; and
   an interference signal-canceling unit configured to cancel the pseudo interference signals from the received vector,
   wherein the detection unit detects the second data based on the received vector from which the pseudo interference signals are cancelled.

2. The apparatus of claim 1, further comprising:
   an inverse matrix calculation unit configured to calculate an inverse matrix of the channel state matrix or a pseudo-inverse matrix of the channel state matrix,
   wherein the detection unit multiplies the inverse matrix of the channel state matrix or the pseudo-inverse matrix of the channel state matrix by the received vector to detect the first data.

3. The apparatus of claim 1, further comprising:
   a priority determination unit configured to determine a data detection priority by comparing the first data with the second data.

4. The apparatus of claim 1, wherein the detection unit detects the first data using a zero-forcing detection scheme or a minimum-mean square error (MMSE) detection scheme.

5. A method for an apparatus to cancel inter-antenna interference, the method comprising:
   receiving, from a transmitter, first data and second data orthogonally coded with the first data;
   generating a received vector including the first data and the second data;
   generating a channel state matrix with respect to a radio channel from a plurality of transmission antennas of the transmitter to a receiver of the apparatus;
   detecting the first data based on the channel state matrix and the received vector;
   generating pseudo interference signals based on the channel state matrix and the detected first data;
   canceling the pseudo interference signals from the received vector; and
   detecting the second data based on the received vector from which the pseudo interference signals are cancelled.

6. The method of claim 5, further comprising:
   calculating an inverse matrix of the channel state matrix or a pseudo-inverse matrix of the channel state matrix,
   wherein the detecting of the first data comprises multiplying the inverse matrix of the channel state matrix or the pseudo-inverse matrix of the channel state matrix by the received vector to detect the first data.

7. The method of claim 5, further comprising:
   determining a data detection priority by comparing the first data with the second data.

8. The method of claim 5, wherein the detecting of the first data comprises detecting the first data using a zero-forcing detection scheme or a minimum-mean square error (MMSE) detection scheme.

9. A non-transitory computer-readable storage medium storing a program to cancel inter-antenna interference, comprising instructions to cause a computer to:
   receive, from a transmitter, first data and second data orthogonally coded with the first data;
   generate a received vector including the first data and the second data;
   generate a channel state matrix with respect to a radio channel from a plurality of transmission antennas of the transmitter to a receiver;
   detect the first data based on the channel state matrix and the received vector;
   generate pseudo interference signals based on the channel state matrix and the detected first data;
   cancel the pseudo interference signals from the received vector; and
   detect the second data based on the received vector from which the pseudo interference signals are cancelled.

10. An apparatus to cancel inter-antenna interference, the apparatus comprising:
- a reception unit configured to receive, from a transmitter, received data which comprises first data and second data orthogonally coded with the first data, and to generate a received vector including the first data and the second data;
- a channel estimation unit configured to generate a channel state matrix with respect to a radio channel from a plurality of transmission antennas of the transmitter to the reception unit;
- a detection unit configured to detect detected data comprising the first data, the detection unit is configured to detect the first data based on the channel state matrix and the received vector;
- a pseudo interference signal-generation unit configured to generate pseudo interference signals based on the channel state matrix and the detected first data; and
- an interference signal-canceling unit configured to cancel the pseudo interference signals from the received vector,
- wherein the detected data further comprises the second data, and the detection unit is configured to detect the second data based on the received vector from which the pseudo interference signals are cancelled.

11. The apparatus of claim 10, further comprising:
a priority determination unit configured to determine a data detection priority by comparing the first data with the second data.
wherein the detection unit detects each of the received data, and the priority determination unit determines the data detection priority based on differences between the detected data and elements of the received vector corresponding to the detected data.

12. The apparatus of claim 10, further comprising:
a priority determination unit configured to determine a data detection priority by comparing the first data with the second data,
wherein the detection unit detects each of the received data and generates a detection data vector including each of the received data, the apparatus further comprises a covariance matrix calculation unit to calculate a covariance matrix of the received vector and the detection data vector, and the priority determination unit determines the data detection priority based on magnitudes of diagonal elements of the covariance matrix.

13. The apparatus of claim 10, wherein at least a subset of the detected data comprises data which includes interference signals,
wherein the apparatus further comprises a priority determination unit to determine a data detection priority by comparing the first data with the second data, and
wherein the priority determination unit determines the data detection priority based on magnitudes of powers of the data which includes the interference signals.

14. A method for an apparatus to cancel inter-antenna interference, the method comprising:
receiving, from a transmitter, received data comprising first data and second data orthogonally coded with the first data;
generating a received vector including the first data and the second data;
generating a channel state matrix with respect to a radio channel from a plurality of transmission antennas of the transmitter to a receiver of the apparatus;
detecting detected data comprising the first data and the second data, the first data being detected based on the channel state matrix and the received vector;
generating pseudo interference signals based on the channel state matrix and the detected first data; and
canceling the pseudo interference signals from the received vector,
wherein the second data is detected based on the received vector from which the pseudo interference signals are cancelled.

15. The method of claim 14, further comprising:
determining a data detection priority by comparing the first data with the second data,
wherein at least a subset of the detected data comprises data which includes interference signals that are detected based on the received vector, and
wherein the determining of the data detection priority comprises determining the data detection priority based on differences between the data which includes the interference signals and elements of the received vector corresponding to the data which includes the interference signals.

16. The method of claim 14, wherein at least a subset of the detected data comprises data which includes interference signals that are detected based on the received vector,
wherein the method further comprises
determining a data detection priority by comparing the first data with the second data,
generating a detection data vector including the data which includes the interference signals; and
calculating a covariance matrix of the received vector and the detection data vector, and
wherein the determining of the data detection priority comprises determining the data detection priority based on magnitudes of diagonal elements of the covariance matrix.

17. The method of claim 14, wherein at least a subset of the detected data comprises data which includes interference signals,
wherein the method further comprises determining a data detection priority by comparing the first data with the second data, and
wherein the determining of the data detection priority comprises determining the data detection priority based on magnitudes of powers of the data which includes the interference signals.

* * * * *